(12) United States Patent
Kanamori et al.

(10) Patent No.: US 6,363,410 B1
(45) Date of Patent: *Mar. 26, 2002

(54) METHOD AND SYSTEM FOR THREADED RESOURCE ALLOCATION AND RECLAMATION

(75) Inventors: Atsushi Kanamori; Jon Thomason, both of Redmond, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/354,559

(22) Filed: Dec. 13, 1994

(51) Int. Cl.[7] .................................................. G06F 9/00

(52) U.S. Cl. ...................................... 709/104; 709/107

(58) Field of Search ................................ 395/650, 700, 395/674, 675, 677, 670; 364/281.6, 281.1, 238; 709/104, 105, 107, 100, 102

(56) References Cited

U.S. PATENT DOCUMENTS

| | | | |
|---|---|---|---|
| 5,046,001 A | * 9/1991 | Barker ........................ | 364/200 |
| 5,088,036 A | * 2/1992 | Ellis ........................... | 395/425 |
| 5,093,912 A | * 3/1992 | Dong .......................... | 395/650 |
| 5,212,793 A | * 5/1993 | Donica et al. ............... | 395/700 |
| 5,345,588 A | * 9/1994 | Greenwood .................. | 395/650 |
| 5,537,542 A | * 7/1996 | Eilert et al. ............. | 395/184.01 |

OTHER PUBLICATIONS

S. Jagannathan et al, "High–Level Abstraction for Efficient Concurrent Systems", Proc. Int. Conf. Programming Languages and System Architecture, Mar. 1994.*

"Memory Management and Response Time" Communications of the ACM, vol. 20, pp 153–165, 1977, R.M. Brown, J.C, Browne, and K.M Chandy "Some Key Issues in the Design of Distributed Garlize Collection and References", Marc Shapiro, Apr. 1994.*

"A Comparison of Resource Allocation and Activity Schedulig Rules in a Dynamic Multi–Project Environment", Journal of Operations Management Kun–Khing Yang, Nov. 1993.*

"A Quencing Flow Model" Proceedings of the 1988 IEEE International Conference on Systems, Man and Cybernetics, Kohn, Jan. 1988.*

"Real–Time Kermel, Real–Time Applications: System Architecture", The Electronic System Design Magazine, V18, N8 P55. Kane, Van R., Aug. 1988.*

(List continued on next page.)

*Primary Examiner*—St. John Courtenay, III
*Assistant Examiner*—S. Lao
(74) *Attorney, Agent, or Firm*—Christensen O'Connor Johnson Kindness PLLC

(57) ABSTRACT

A method and system for threaded resource allocation and reclamation are provided. In a preferred embodiment, a threaded resource allocation and reclamation facility ("the facility") provides available instances of a resource in response to requests from resource consumers. The facility maintains both a central pool for holding available instances of the resource for use by any consumer and individual pools for holding available instances of the resource for use by each consumer. When the facility receives a request for an available instance of the resource from a consumer, it provides one from the individual pool for the requesting consumer. If the individual pool is empty, the facility provides an available instance of the resource from the central pool. In a further preferred embodiment, if the central pool is empty, the facility transfers one or more available instances of the resource from one or more of the individual pools to the central pool, then provides one of the transferred available instances.

20 Claims, 16 Drawing Sheets

OTHER PUBLICATIONS

Shannon, Terry C., "VMS Tuning Fundamentals, Part 1—Enhance Your Understanding of VAX/VMS Resource Management Mechanisms," *The VAX Professional*, vol. 7, No. 3, Jun., 1985, pp. 25–31.

Singer, Carl P. and Prabuddha Biswas, "Modeling Contention Sensing Memory Management Systems: A VAX/VMS Case Study," Proceedings of the Seventh International Conference on Mathematical and Computer Modeling, vol. 14, 1990, pp. 184–189.

* cited by examiner

METHOD AND SYSTEM FOR THREADED RESOURCE ALLOCATION AND RECLAMATION

TECHNICAL FIELD

The invention relates generally to a method and system for managing dynamic resources, and, more specifically, to a method and system for threaded resource allocation and reclamation.

BACKGROUND OF THE INVENTION

An operating system is a set of computer programs that interact with a computer system to provide services and resources requested by application programs. An example of a resource provided by operating systems is a memory segment selector ("selectors"). Selectors are resources used in computers based on the Intel 80×86 series of microprocessors to virtualize the primary storage address space, allowing primary storage contents to be rearranged in primary storage and improving robustness by preventing applications from accidentally overwriting memory that they do not own. FIG. 1 is a diagram demonstrating the use of a selector. The diagram shows an address space 110 used to store and retrieve data. Programs use pointers to store data in and retrieve data from one or more storage devices to which linear addresses within the address space are mapped. Some programs use "segmented pointers" (also called "far pointers") to store and retrieve data. Segmented pointers like pointer 120 are comprised of two parts: a selector identifier (e.g., segment identifier 121) and an offset (e.g., offset 122). The selectors available in a computer system are stored together in a local descriptor table ("LDT") like LDT 130. The selector identifier of a segmented pointer identifies a selector stored in the LDT. For example, the selector identifier 121 ("0x0050") identifies selector 131. Usually the selector identifier is not actually stored in the LDT, but rather it constitutes an offset from the beginning of the LDT to the portion of the LDT corresponding to a particular selector, for example, selector 131 is the selector stored beginning at the 0x0050$^{th}$ byte of the LDT. Each selector identifies a "segment" of the address space by containing a representation of a base address within the address space at which that segment begins. For example, selector 131 contains a base representation 133 of "0x0100000", which represents linear address 0x01000000. Selector 131 therefore identifies segment 111, which begins at linear addresses 0x01000000 (the base) and continues to 0x0100FFFF (the base plus a maximum length value). The linear address referred to by a segmented pointer is consequently the sum of the base represented by the selector identified by the segment identifier of the segmented pointer and offset of the segmented pointer. As an example, the segmented pointer 120 refers to linear address 112 ("0x01008000").

In many operating systems, selectors are frequently allocated and released. For instance, whenever the operating system allocates a block of memory within the address space for an application that uses segmented pointers, it allocates a new selector and sets its base to the linear address at the beginning of the block. The operating system then returns a segmented pointer to the application comprised of the identifier of the allocated selector and the offset zero. When the application frees the block, the operating system frees the selector. Selectors are especially frequently allocated and released in hybrid operating systems in which both application that use segmented pointers and applications that use flat pointers containing a linear address. When an application that uses flat pointers attempts to pass a flat pointer containing a linear address to an application that uses segmented pointers, the operating system allocates a new selector and sets its base to the linear address. The operating system then passes a segmented pointer to the application comprised of the identifier of the allocated selector and the offset zero. When the application that receives the segmented pointer no longer needs it, the operating system frees the selector.

Because virtually every type of resource provided to application programs is scarce within the computer system, an operating system must allocate and reclaim resources in a way that maximizes their availability to application programs. Further, because applications request some types of resources frequently in a typical computer system, the portion of the operating system that responds to requests to allocate and reclaim resources must operate efficiently.

Both of these goals for resource allocation are more difficult to achieve in a multithreaded operating system. Multithreaded operating systems appear to execute several application programs at once by maintaining multiple execution contexts (typically at least one for each active application), each comprised of separate program counters and register values. Each execution context is said to correspond to a different thread. Typically, in multithreaded operating system running on a single processor, one thread at a time may be active and execute instructions. Such a multithreaded operating system provides concurrent processing of the threads, that is, the illusion of simultaneous processing, by frequently changing the execution context so that each thread, in turn, is the active thread and executes instructions for a brief period.

FIGS. 2A–2C are allocation diagrams that demonstrate a common conventional approach to resource allocation and reclamation in a multithreaded operating system. FIG. 2A shows that 16 selectors, numbered 0x0001–0x0010, are available within a computer system. Some of these selectors are in use by a thread, while the others are unused, or "free." Each thread that exists in the computer system is represented by a box bounded with broken lines. Box 210 shows that selector 0x0001 is in use by thread 1; box 220 shows that selector 0x0002 is in use by thread 2; and box 230 shows that thread 3 is not currently using any selectors. The other 14 selectors, 0x0003–0x0010, are free, and are stored in a structure called the free list. The free list is a linked list 240, which has a head 241 that points to the first item. The first item corresponds to selector 0x0003, and contains a pointer to the next item, which corresponds to selector 0x0004. The free list is terminated by a null pointer stored in the last item, which corresponds to selector 0x0010.

FIG. 2B is an allocation diagram that demonstrates the allocation of a free selector. When thread 3 requests the allocation of a selector, the approach removes the first item of the list, 0x0003, and allocates the associated selector to thread 3. Selector 0x0003 therefore appears in the box for thread three, box 230. The first item is removed from the free list by copying the pointer in the head to the first item for the requesting thread, then copying the pointer in the first item into the head.

FIG. 2C is an allocation diagram that demonstrates the reclamation of a freed selector. When thread 2 finishes using selector 0x0002, it frees selector 0x0002 by requesting its reclamation, and the approach adds an item to the free list representing the reclaimed selector. The item is added to the free list by creating an item representing the reclaimed selector, copying the pointer in the head into the created item, and replacing the pointer in the head with a pointer to the created item.

Removing an item from the free list, as required by the allocation demonstrated in FIG. 2B, and adding an item to the free list, as required by the reclamation demonstrated in FIG. 2C, are both delicate operations. If two different threads were to each cause the operating system to modify the free list at approximately the same time and the component operations of the modifications were temporally interleaved, the free list could be corrupted. For example, if both a first and a second thread were attempting to free different selectors, and the first thread was interrupted between the two constituent operations of the freeing process by all of the operations of the freeing process from the second thread, the selector "freed" would not end up on the list.

As a result, the free list is typically protected by a synchronization mechanism, such as a mutual-exclusion semaphore, that allows only one thread at a time to manipulate the free list. This is indicated in the diagrams by the wavy boundary surrounding the free list. When the operating system, during execution of a particular thread, needs to modify the free list, the operating system "attempts to acquire" the synchronization mechanism. If the synchronization mechanism is not "currently acquired"—that is, if no other thread has acquired the synchronization mechanism without subsequently releasing it—the acquiring thread is permitted to acquire the synchronization mechanism. The operating system, during execution of the acquiring thread, then adds an item to or removes an item from the free list and releases the synchronization mechanism. If, on the other hand, the synchronization mechanism is currently acquired, the attempting thread is typically suspended (i.e., permitted to execute no further instructions) until the synchronization mechanism is subsequently released.

While the use of a synchronization mechanism to protect the free list prevents the corruption of the free list by preventing threads from modifying it contemporaneously, it also introduces significant overhead into the allocation and reclamation processes. First, synchronization typically requires the execution of an extra series of several administrative instructions for each attempt to acquire and release the synchronization mechanism. Second, the suspension of threads that attempt to acquire the synchronization mechanism when it has been acquired but not released by another thread impedes the progress of the suspended threads. As a result, computer system performance is degraded during periods in which allocation and reclamation occur frequently.

SUMMARY OF THE INVENTION

It is an object of the invention to provide a method and system in a computer system for threaded resource allocation and reclamation.

It is another object of the invention to provide a method and system in a computer system for providing available instances of a resource.

It is a further object of the invention to provide a method and system in a computer system for reclaiming available instances of a resource.

It is yet a further object of the invention to provide a method and system for managing free memory selectors.

These and other objects, which will become apparent as the invention is more fully described below, are provided by a method and system for threaded resource allocation and reclamation. The invention provides the advantage of removing the synchronization overhead typically required to perform routine resource allocations and reclamations in a multithreaded system, while at the same time guaranteeing that all free resources are ultimately available to any thread that requests them. In a preferred embodiment, a resource allocation and reclamation facility ("the facility"), which is preferably integrated into an operating system, manages the allocation and reclamation of available instances of a scarce system resource ("instances"), such as memory selectors. In addition to a central free list of instances for allocation to any thread ("the central free list"), the facility maintains, for each thread, an individual free list of instances for allocation to that thread only ("individual free lists"). While the central free list is preferably protected by a mutual-exclusion semaphore ("semaphore") to prevent simultaneous access by multiple threads, the individual free lists are not protected by semaphores, since they may each be accessed only by their own thread, and therefore are not subject to simultaneous access.

Briefly, when a thread requests an instance, the facility first attempts to allocate an instance from the thread's individual free list. This allocation proceeds quickly, because the individual free list is not protected by a semaphore. If the requesting thread's individual free list is empty, the facility acquires the semaphore that protects the central free list and attempts to allocate an instance from the central free list. If the central free list is empty, the facility suspends the execution of all of the other threads while it transfers instances from the individual free lists to the central free list, one of which it allocates to the requesting thread. When a thread releases an instance that it has finished using, the facility reclaims it by placing the instance on the releasing thread's individual free list, allowing it to be quickly allocated back to the releasing thread to satisfy a future request.

DETAILED DESCRIPTION OF THE INVENTION

A method and system for threaded resource allocation and reclamation in a multithreaded computer system are provided. The invention provides the advantage of removing the synchronization overhead typically required to perform routine resource allocations and reclamations in a multithreaded system, while at the same time guaranteeing that all free resources are ultimately available to any thread that requests them. In a preferred embodiment, a resource allocation and reclamation facility ("the facility"), which is preferably integrated into an operating system, manages the allocation and reclamation of available instances of a scarce system resource ("instances"), such as memory selectors, to and from individual threads, also called "consumers" because they consume the resource. In addition to a central free list of instances for allocation to any thread ("the central free list" or "the master list"), the facility maintains, for each thread, an individual free list of instances for allocation to that thread only ("individual free list"). While the central free list is preferably protected by a synchronization mechanism such as a mutual-exclusion semaphore ("semaphore"), to prevent simultaneous access by multiple threads, the individual free lists are not protected by semaphores, since they may each be accessed only by their own thread, and therefore are not subject to simultaneous access.

Briefly, when a thread requests an instance, the facility first attempts to allocate an instance from the individual free list for the thread. This allocation proceeds quickly, because the individual free list is not protected by a semaphore. If the individual free list for the requesting thread is empty, the facility acquires the semaphore that protects the central free list and attempts to allocate an instance from the central free list. If the central free list is empty, the facility suspends the execution of all of the other threads while it transfers instances from the individual free lists to the central free list, one of which it allocates to the requesting thread. When a thread releases an instance that it has finished using, the facility reclaims it by placing it on the individual free list for the releasing thread, allowing it to be quickly allocated back to the releasing thread to satisfy a future request. Those skilled in the art will recognize that the invention is not dependent upon the use of lists to store instances but that, rather, pools, sets, and other types of collections could all be substituted therefor. In order to support the transfer of instances from individual free collections to the central free collection, the individual free collections are preferably managed using atomic operations that leave the collection in a valid form between every pair of operations.

Figure 1:
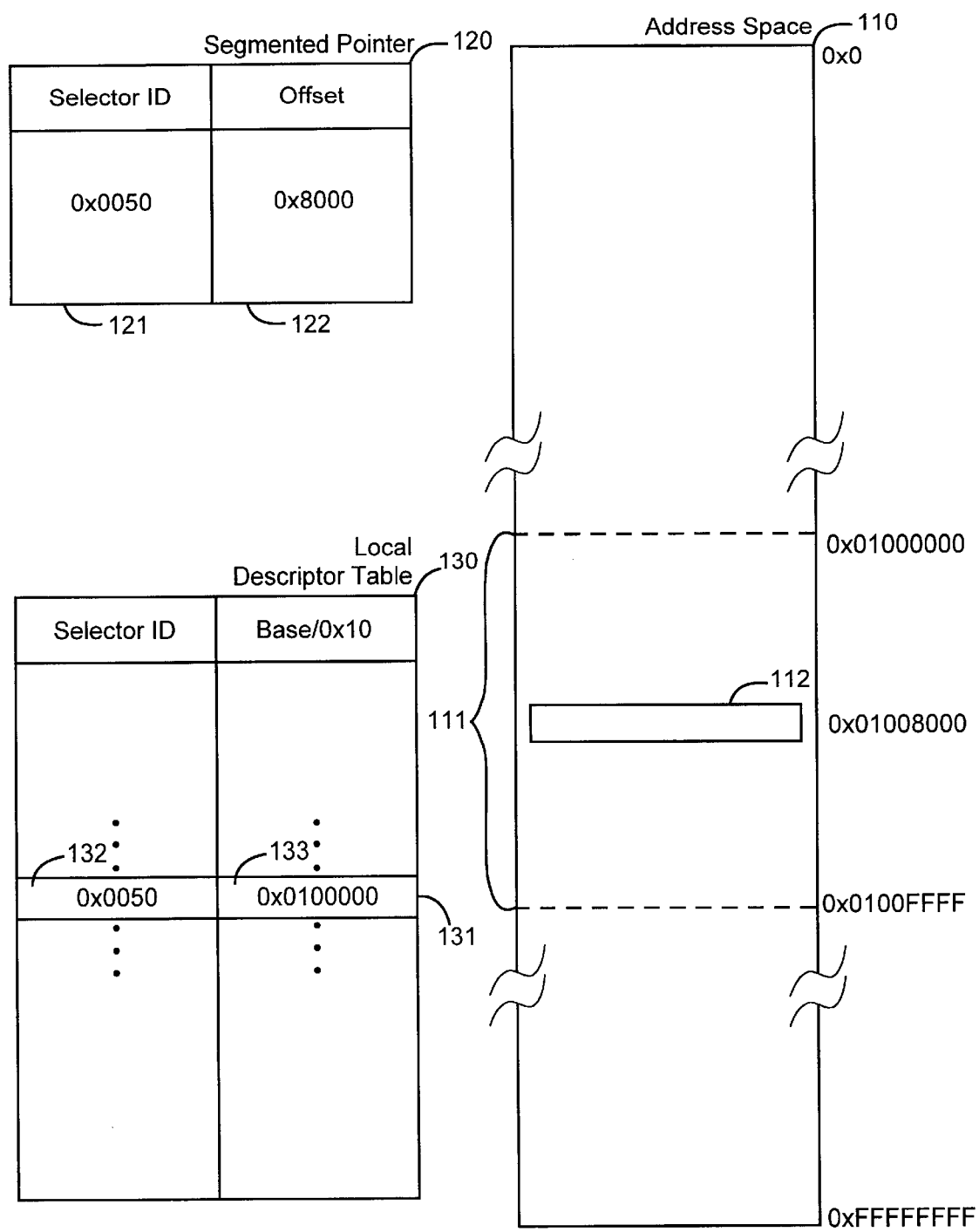
FIG. 1 is a diagram demonstrating the use of a selector.
Figure 2A:
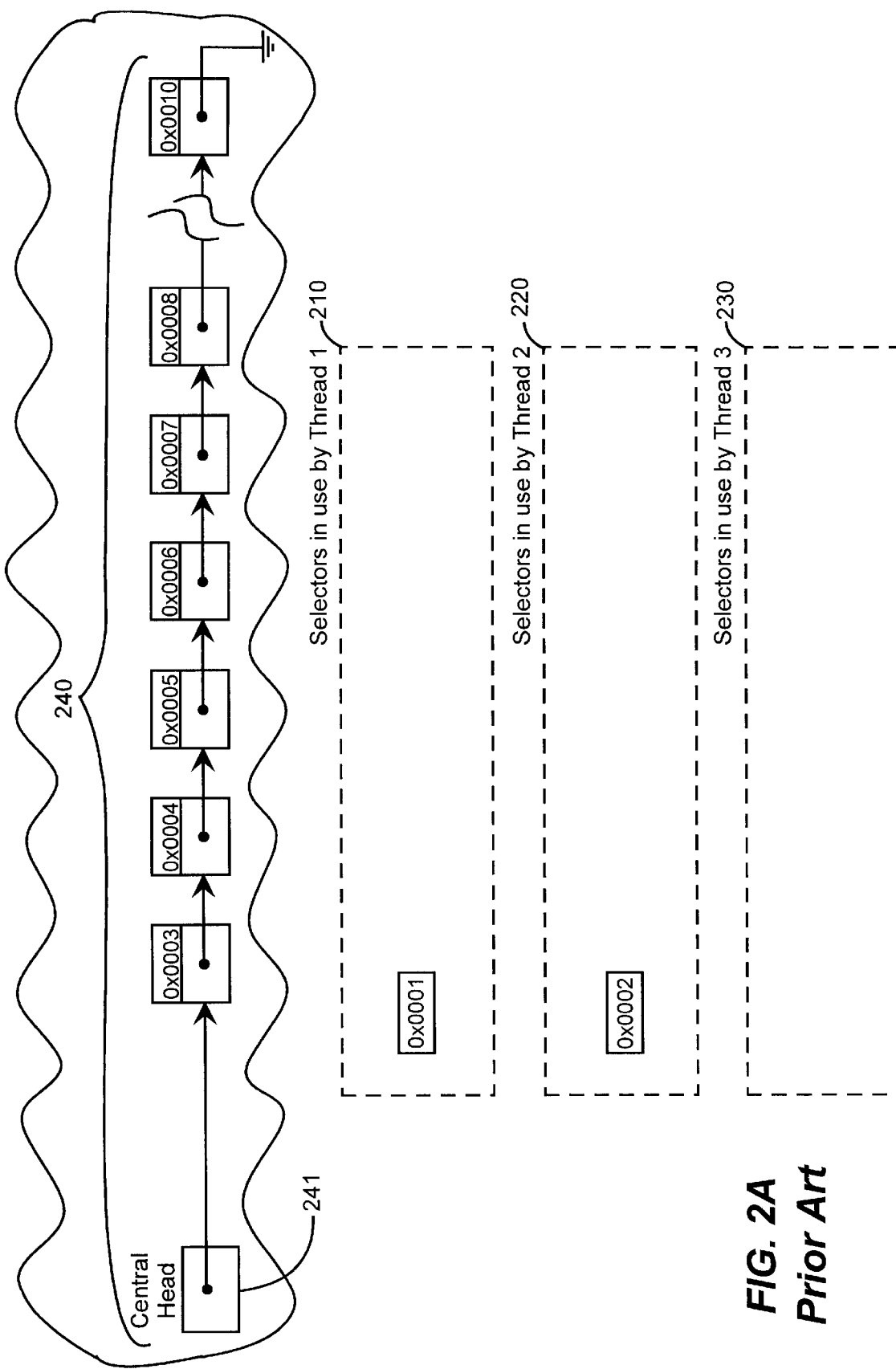
FIGS. 2A–2C are allocation diagrams that demonstrate a common conventional approach to resource allocation and reclamation in a multithreaded operating system.
Figure 2B:
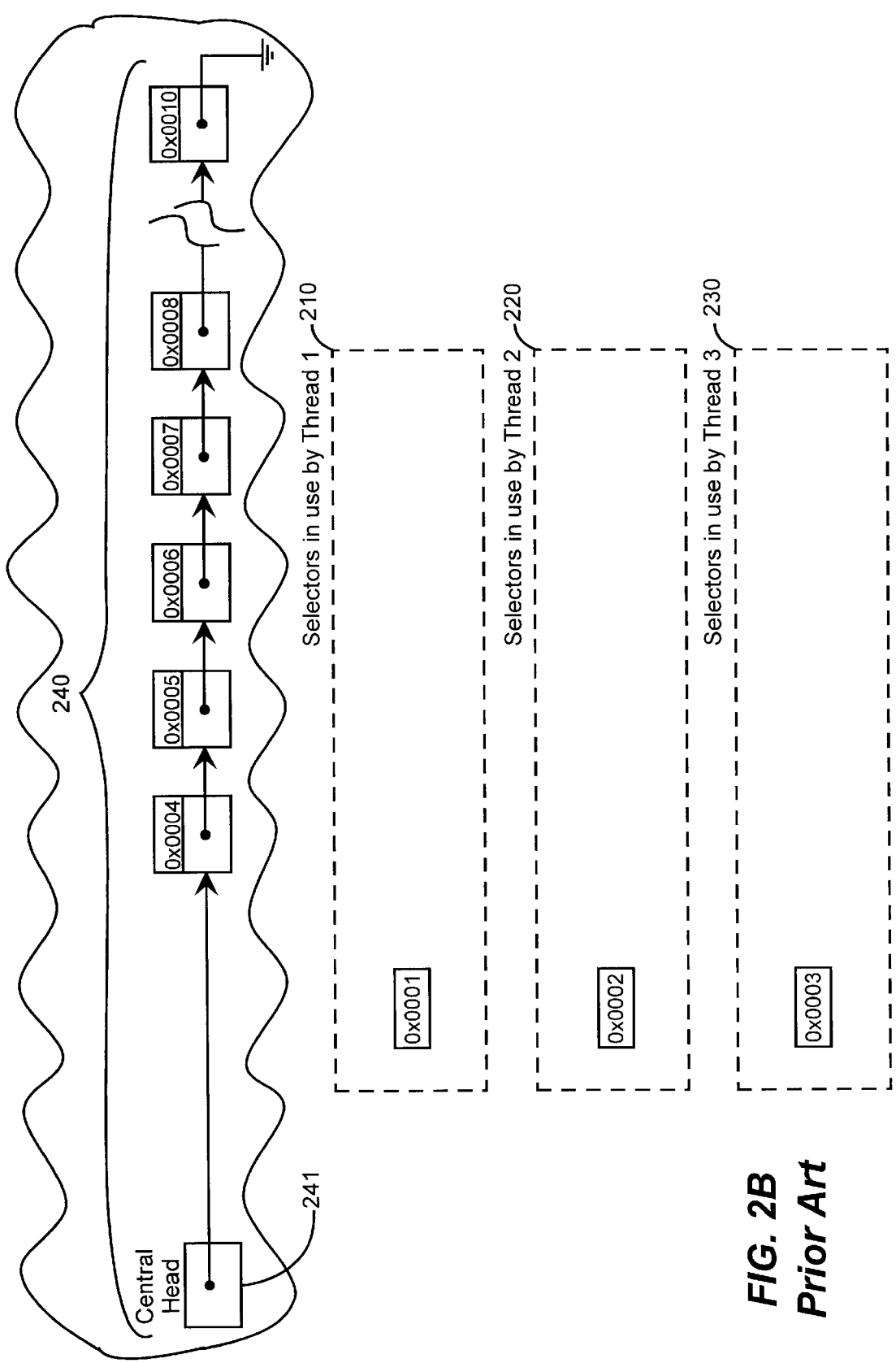
Figure 2C:
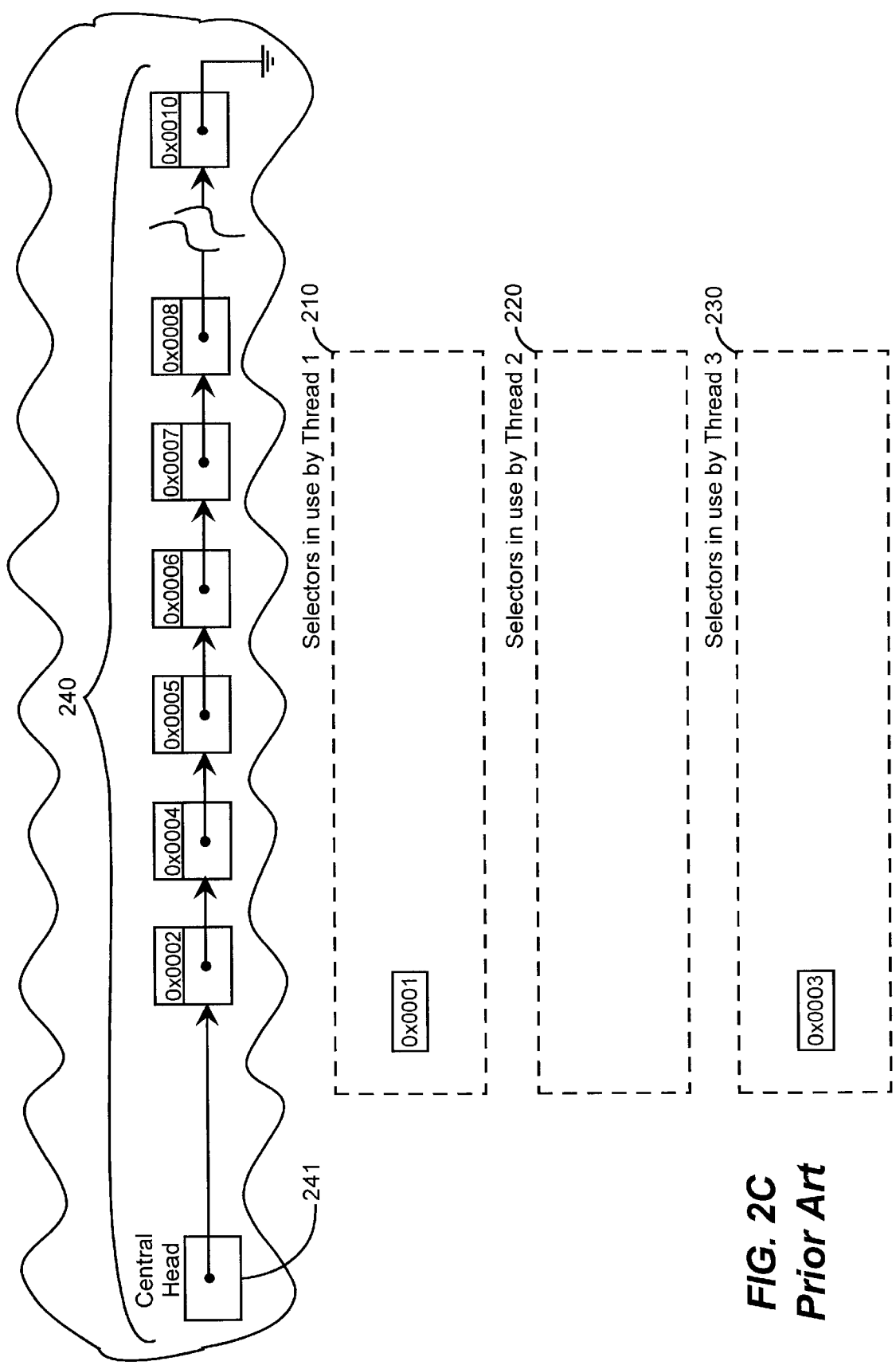
Figure 3:
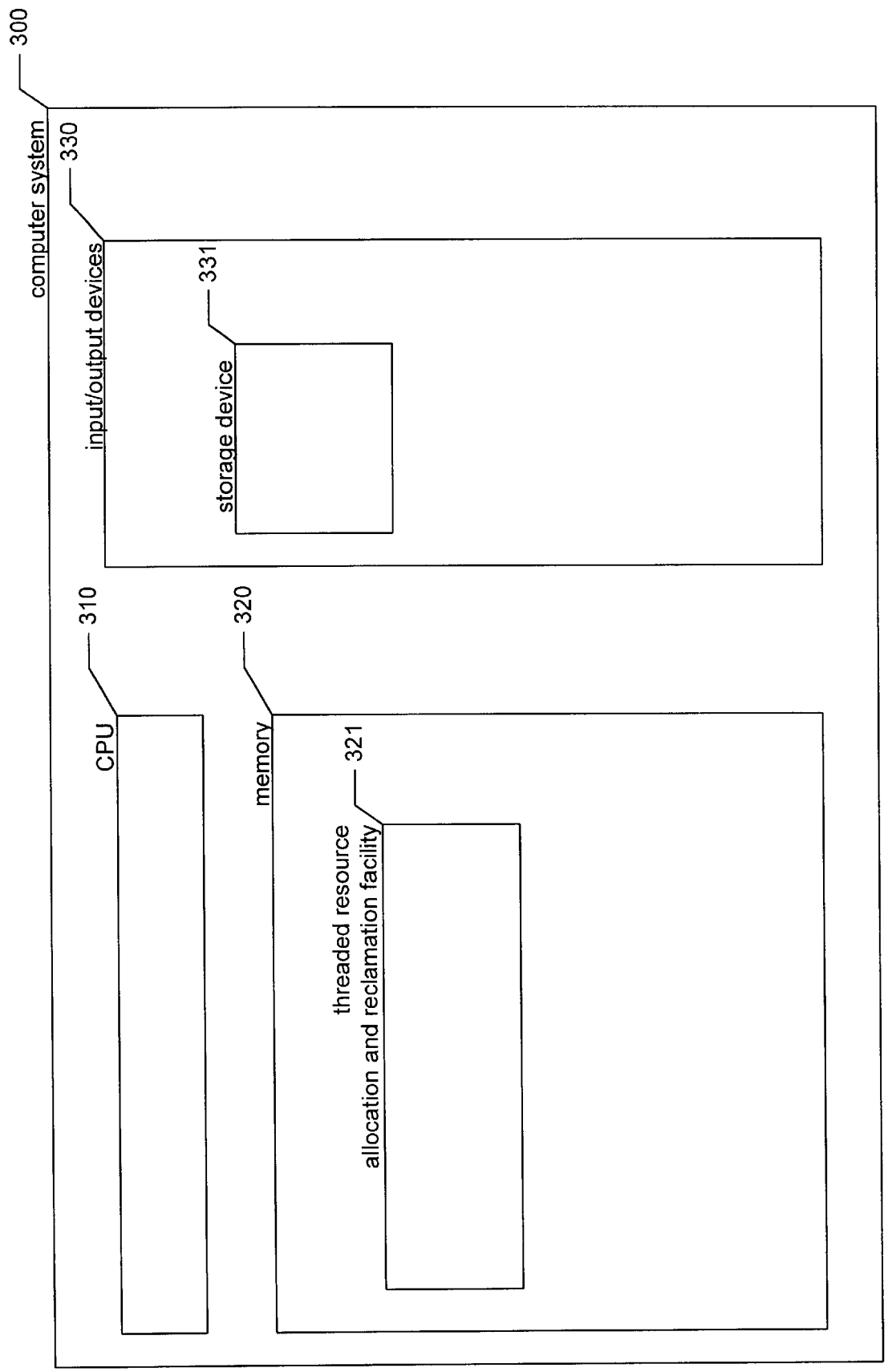
FIG. 3 is a high-level block diagram of the general-purpose computer system upon which the facility preferably operates.

FIG. 3 is a high-level block diagram of the general-purpose computer system upon which the facility preferably operates. The computer system 300 contains a central processing unit (CPU) 310, input/output devices 320, and a computer memory (memory) 330. Among the input/output devices is a storage device 321, such as a hard disk drive. The facility 330 preferably resides in the memory and executes on the CPU. While the facility is preferably implemented on a computer system configured as described above, one skilled in the art will recognize that it may also be implemented on computer systems having different configurations. In a preferred embodiment, the central free list and each of the individual free lists is a limited list whose items each correspond to an instance of the resource (for example, a selector). In a further preferred embodiment in which the type of the resource is limited to selectors, the free selectors are stored in a local descriptor table ("LDT"). For each of the linked lists, the next item pointer for each selector that identifies the next selector in the list is stored inside the selector in the LDT, and is preferably the offset from the beginning of the LDT of the next selector in the linked list.

The facility preferably comprises several subroutines, shown in FIGS. 5–8, which are preferably provided as part of an operating system. FIGS. 4A–4G are allocation diagrams demonstrating the operation of the facility to manage available selectors. In FIGS. 4A–4G, individual selectors are each identified by their selector identifier. As noted above, the facility is easily adapted to manage available instances of resources of any type, and is by no means limited to managing selectors. Those skilled in the art will recognize that instances of resources of a particular type may be identified by a variety of interchangeable means, including using unique identifiers to identify each instance and using pointers to store each address of an instance.

Figure 4A:
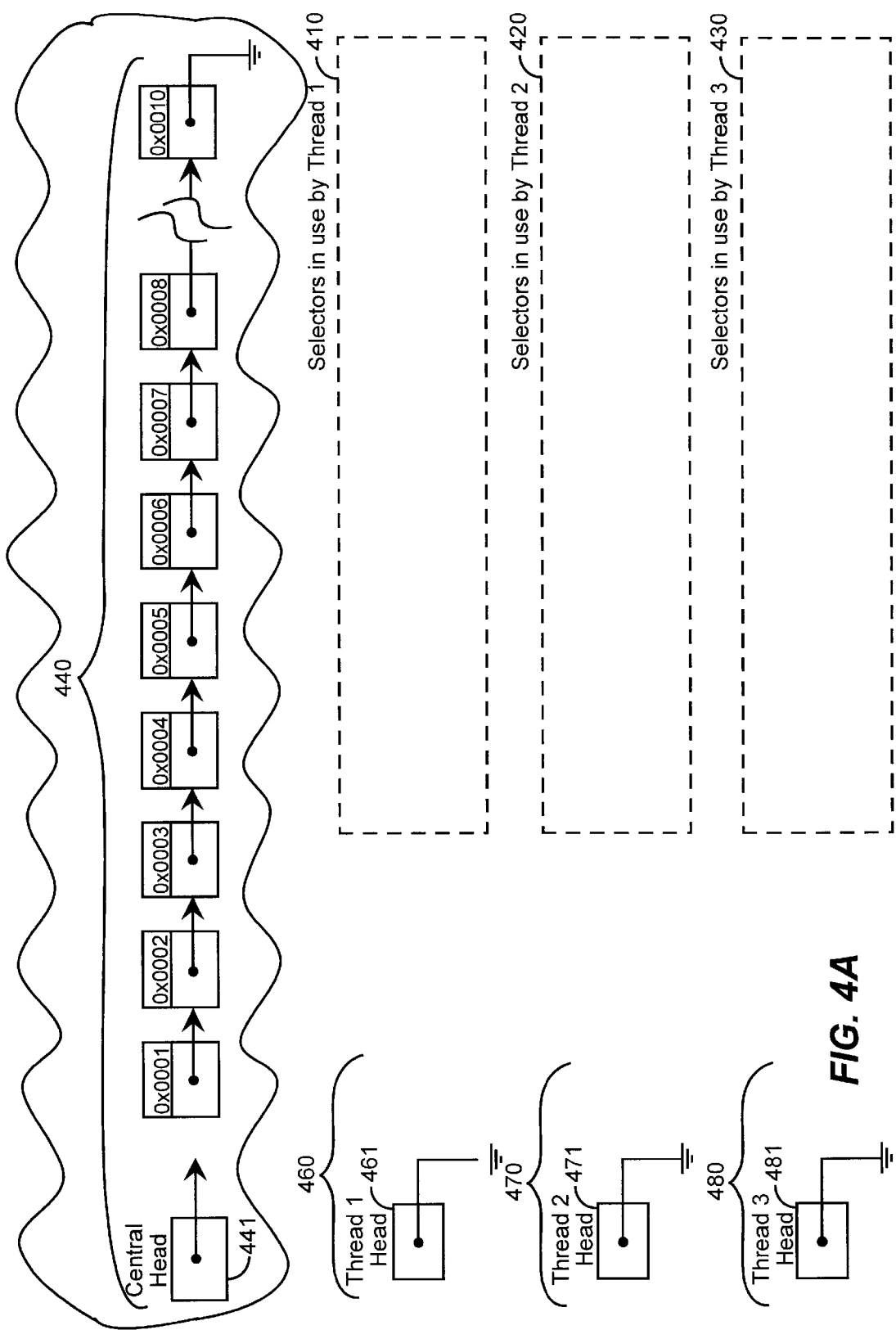
FIGS. 4A–4G are allocation diagrams demonstrating the operation of the facility to manage available selectors.

FIG. 4A is an allocation diagram that shows the initial allocation state of the facility. The diagram shows a central free list 440, pointed to by a central head 441 and containing items each identifying a selector that can be allocated to any thread. For example, the first item, containing selector identifier "0x0001", identifies selector 0x0001. The central free list initially holds all of the selectors in the system. The wavy boundary surrounding the central free list indicates that it is protected by a semaphore, which a thread must acquire before it can add items to or remove items from the central free list. The diagram also contains three boxes 410, 420, and 430, which contain indications of the selectors presently in use by three threads, threads 1, 2, and 3, respectively. The diagram shows, by the fact that all of these boxes are empty, that none of the threads is initially using any selectors. The diagram further shows individual free lists for each thread, identified by thread 1 head 460, thread 2 head 470, and thread 3 head 480. As discussed above, each thread may add items to or remove items from its individual list without having to acquire a semaphore, thereby expediting the processes of allocation and reclamation. The diagram shows that the individual free lists are all initially empty.

Figure 4B:
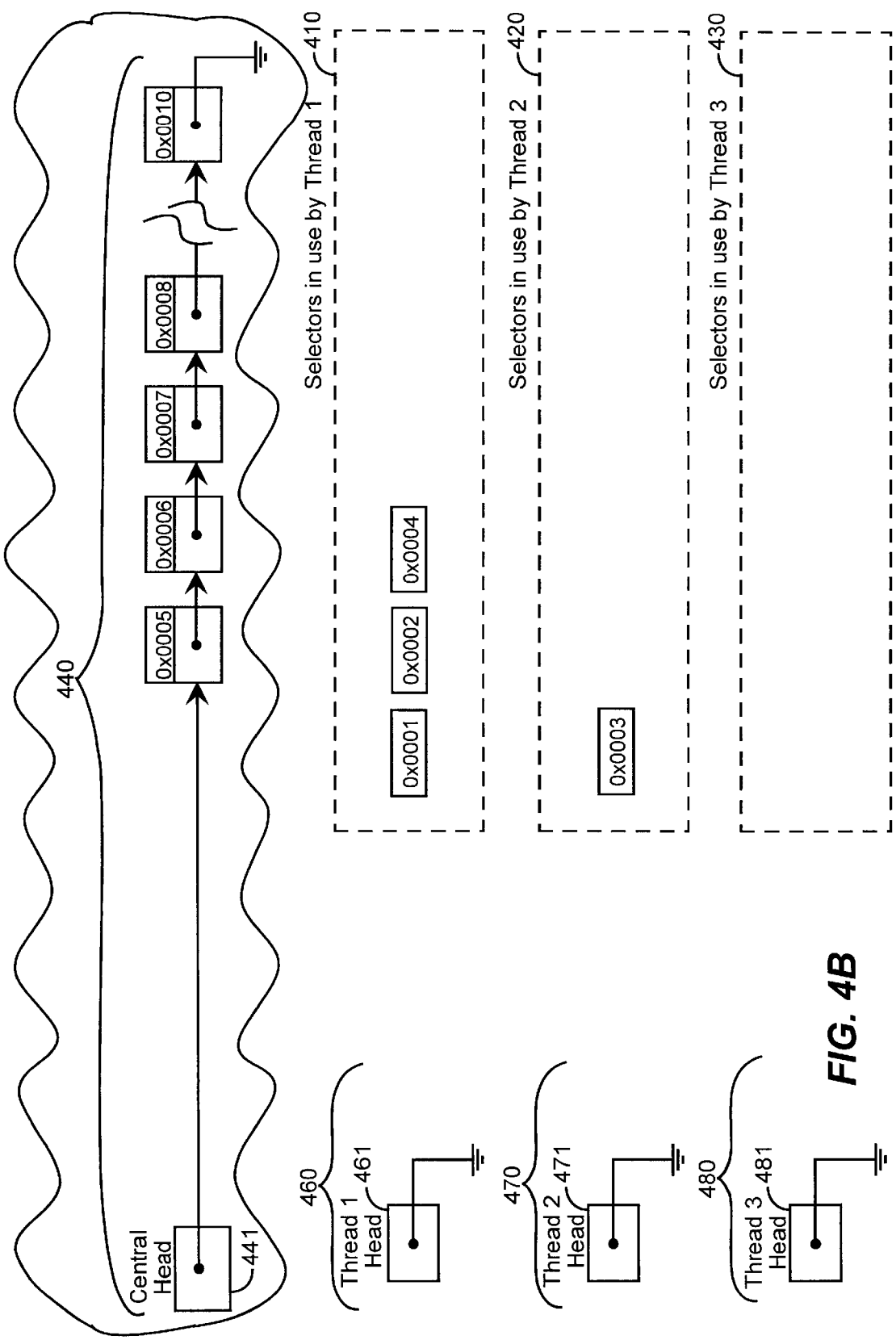

FIG. 4B shows the allocation state of the facility after it has allocated selectors from the central free list to some of the threads, and demonstrates selector allocation. Thread 1 has acquired selectors 0x0001, 0x0002, and 0x0004, as shown by the presence of small boxes bearing these selector identifiers in the box 410 of the selectors in use by thread 1. Similarly, thread 2 has acquired selector 0x0003. In the case of each acquired selector, the thread called an Allocate subroutine (described in detail below) to request the allocation of a selector. The Allocate subroutine checked the corresponding individual free list and found it to be empty. The Allocate subroutine then, in turn, called an Allocate From Central Free List subroutine (also described in detail below) to attempt to allocate an item from the central free list. The Allocate From Central Free List subroutine then acquired the semaphore protecting the central free list, removed the first item in the central free list (by copying the pointer in the central head to a temporary allocated item pointer, then copying the pointer in the first item to the central head), released the semaphore, and returned the temporary allocated item pointer to the thread so that the thread could begin using the selector indicated by the item.

Figure 4C:
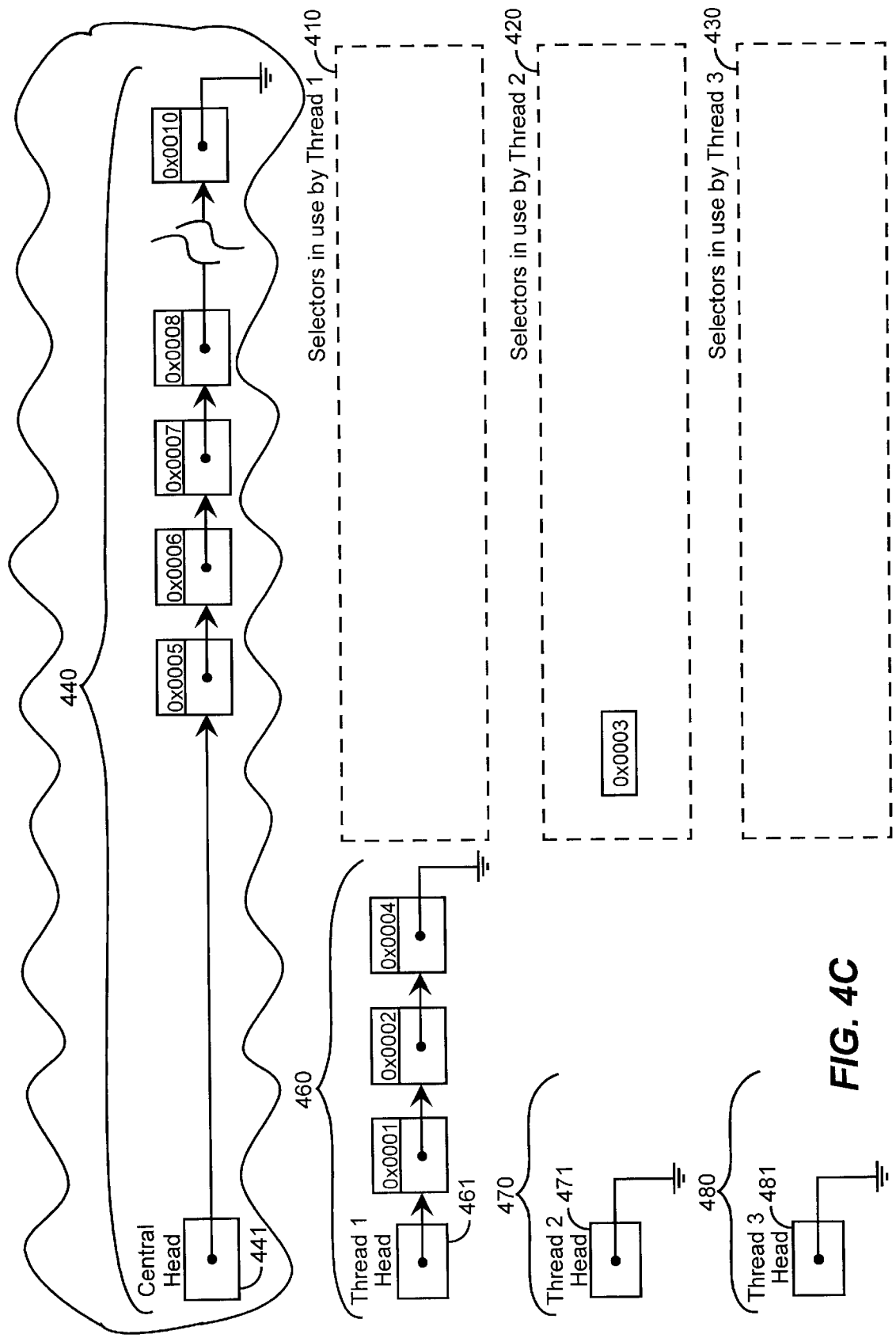

FIG. 4C shows the allocation state of the facility after thread 1 has released its selectors, and demonstrates selector reclamation. Thread 1 finished using and released selectors 0x0001, 0x0002, and 0x0004, as shown by their absence from box 410 and the presence of items for these selectors in the individual free list for thread 1. The process of adding a new item to an individual free list is expedited by the fact that individual free lists are not protected by semaphores. In the case of each released selector, the facility called a Release subroutine (described in detail below), passing the selector identifier of the selector, in order to release the selector. The Release subroutine then added a new item to the beginning of the individual free list for the released selector (by creating a new item containing the identifier of the released selector, copying the pointer in the thread 1 head to the new item, and changing the pointer in the head to point to the new item). Because this process is repeated for every selector released by any thread without requiring the acquisition and release of a semaphore, its time-effectiveness greatly improves the performance of the operating system.

It is important that no more than one item is added to an individual free list one at a time, since a Scavenge subroutine for collecting extra items from individual free lists when the central free list is exhausted (described in detail below) could interrupt the process of adding items to the individual free list, and assumes that only the first two items of each individual free list may be in the midst of modification. Because adding two items to the beginning of the list at the same time would involve modifying the pointer to the third (originally the first) item, this would violate this assumption of the Scavenge subroutine. Further, because the Scavenge subroutine depends on being able to begin at the head for an individual list, traverse from the head past the first two items in the list, and collect the remaining items in the list, the facility preferably adds an item at the beginning of the list by first copying the pointer from the head to the new item, then storing a pointer to the new item in the head, so that the head is always pointing to the body of the list.

Figure 4D:
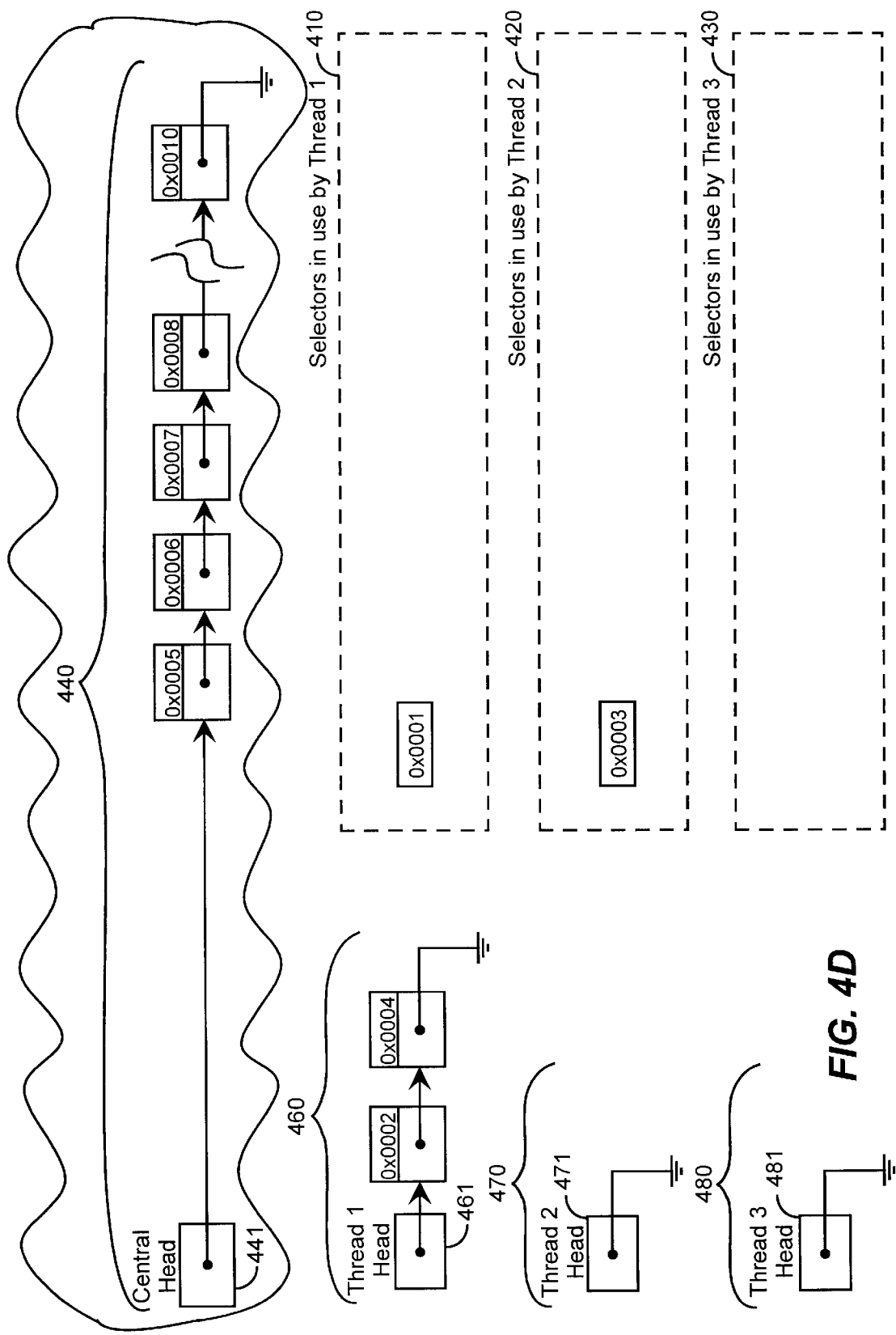

FIG. 4D shows the allocation state of the facility after it has reallocated a selector to thread 1. In order to reach this point, thread 1 called the Allocate subroutine, which successfully allocated a selector identified by an item on the individual free list for thread 1. In order to do so, the facility removed the first item from the list (by copying the pointer in the head to the first item for itself, copying the pointer from the first item to the second item into the head, and returning the selector identifier stored in the removed item). The process of removing an item from an individual free list is expedited by the fact that individual free lists are not protected by semaphores. Because this process would typically be repeated for the great majority of all selector allocations, its time-effectiveness greatly improves the performance of the operating system.

Figure 4E:
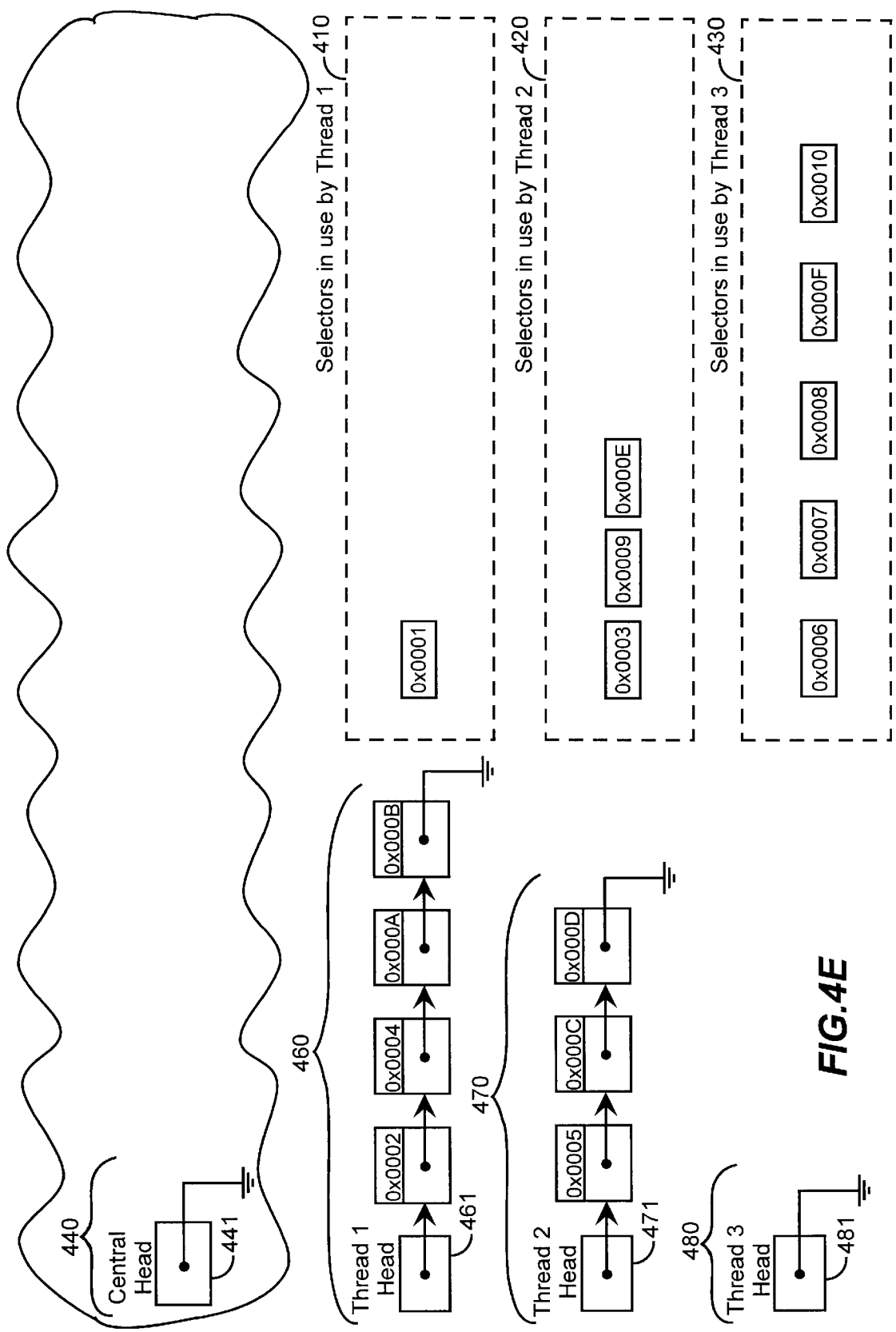
Figure 4F:
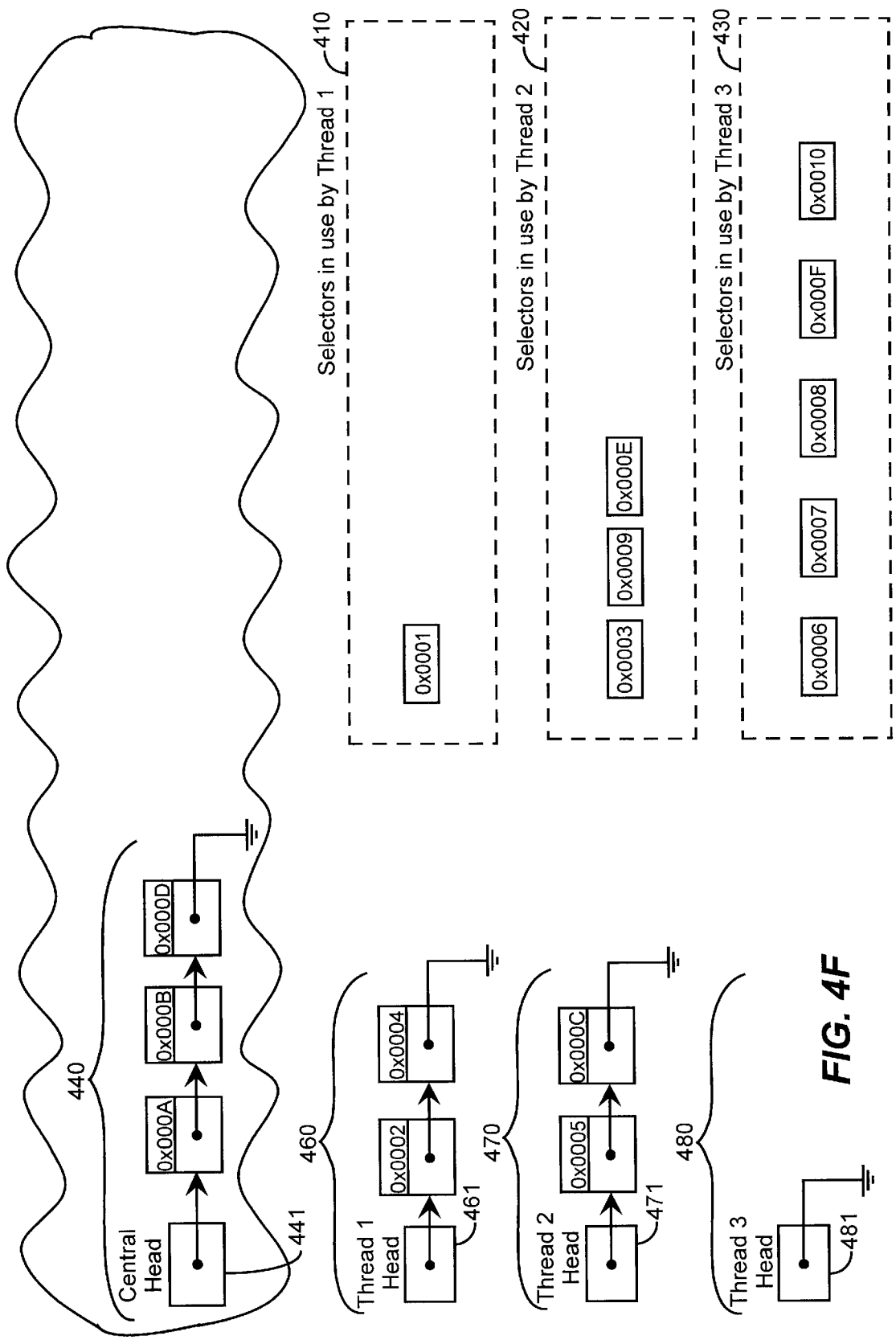
Figure 4G:
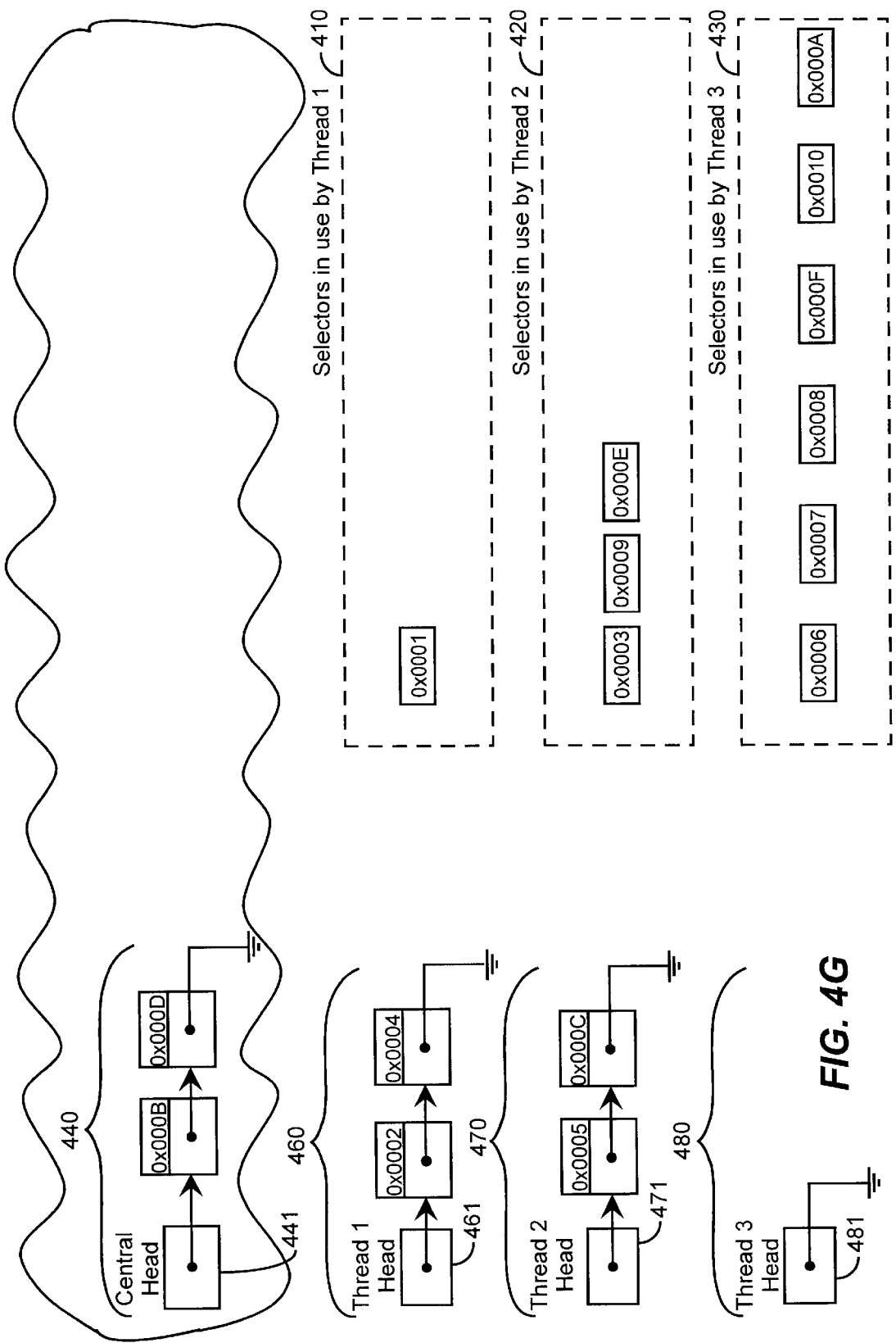

FIGS. 4E–4G demonstrate the operation of the Scavenge subroutine, which resolves situations in which a requested selector can be allocated neither from the requesting thread's individual free list, nor from the central free list, because both are empty. FIG. 4E shows the allocation state of the facility immediately before the facility collects items from the individual free lists and transfers them to the central free list. The diagram shows that both the individual free list for thread 3 and the central free list are empty. Thread 3 then requests the allocation of a selector by calling the Allocate subroutine. The Allocate subroutine determines that the individual free list for the calling thread is empty, and in turn calls the Allocate From Central Free List subroutine. The Allocate From Central Free List subroutine acquires the semaphore protecting the central free list, then determines that the central free list is empty, and accordingly calls the Scavenge subroutine. The Scavenge subroutine suspends threads 1 and 2, and proceeds to, for each individual free list, transfer all but the first two items to the central free list—in this case, the items representing selectors 0x000A, 0x000B, and 0x000D. The transfer of these items is shown in FIG. 4F. The Scavenge subroutine then unsuspends threads 1 and 2, and returns to the Allocate From Central Free List subroutine. The Allocate From Central Free List subroutine then removes the new first item from the central free list; allocates it to the requesting thread, thread 3, as shown in FIG. 4G; and releases the semaphore.

Figure 5:
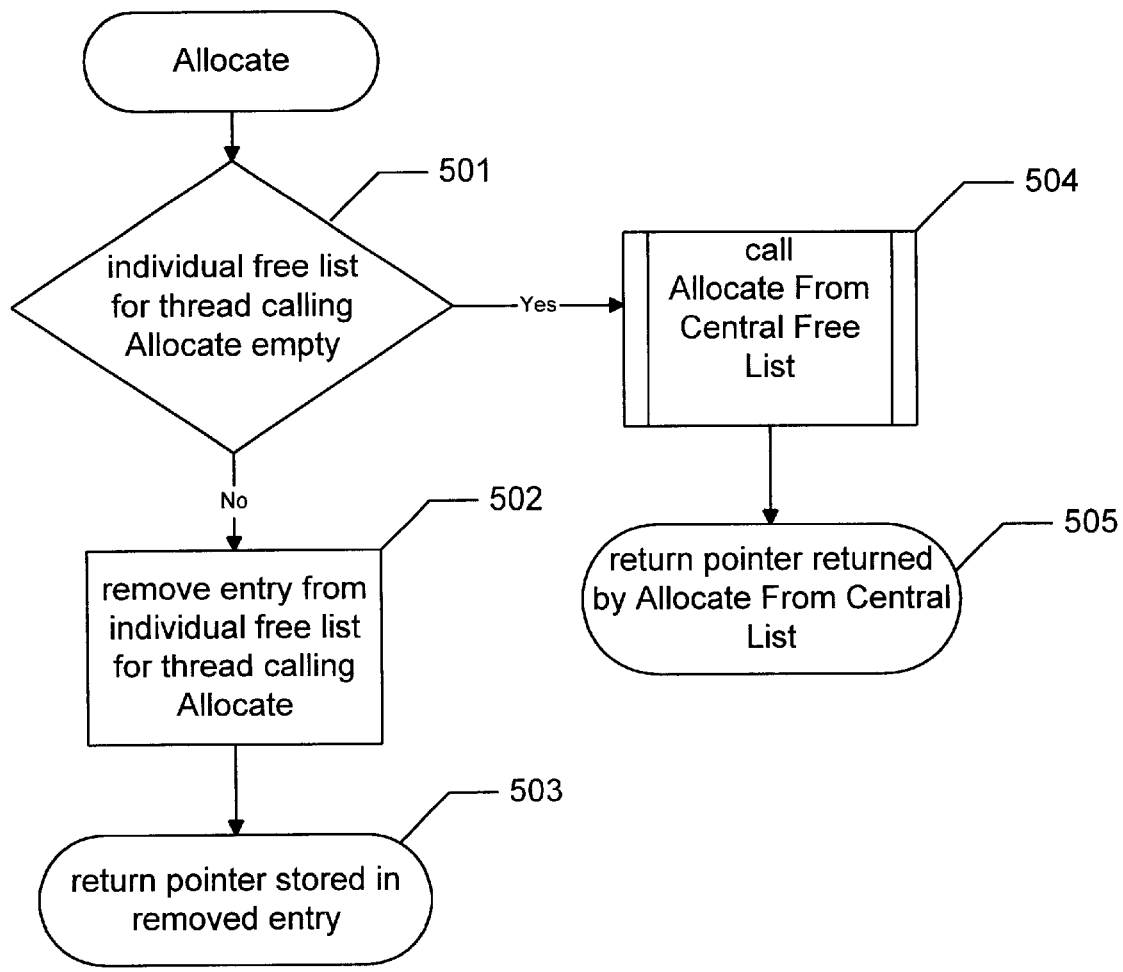
FIG. 5 is a flow diagram of the Allocate subroutine.

FIGS. 5–8 are flow diagrams showing in detail the subroutines that comprise the facility. FIG. 5 is a flow diagram of the Allocate subroutine. A thread calls the Allocate subroutine in order to request the allocation of an available instance of the resource. In step 501, if the individual free list for the thread calling the Allocate subroutine is empty, then the facility continues at step 504, otherwise the facility continues at step 502. In step 502, the facility removes an item from the individual free list for the thread calling the Allocate subroutine. Because the Scavenge subroutine depends on being able to begin at the head for an individual list, traverse from the head past the first two items in the list, and collect the remaining items in the list, step 502 is preferably performed as follows, so that the head is always pointing to the body of the list: the facility first copies the pointer in the head to a temporary allocated item pointer. The facility then copies the pointer from the first item in the list to the head. The facility then continues at step 503. In step 503, the facility returns the pointer stored in the item removed from the individual free list, thereby allocating the instance represented by the removed item to the thread calling the Allocate routine. In step 504, the facility calls the Allocate From Central Free List subroutine in order to attempt to allocate an instance from the central free list. The Allocate From Central Free List subroutine is discussed in greater detail below in conjunction with FIG. 6. In step 505, the facility returns the pointer to an instance returned by the Allocate From Central Free List subroutine, thereby allocating the instance referred to by the returned pointer. If the Allocate From Central Free Lists subroutine fails, the facility preferably returns an error (not shown).

Figure 6:
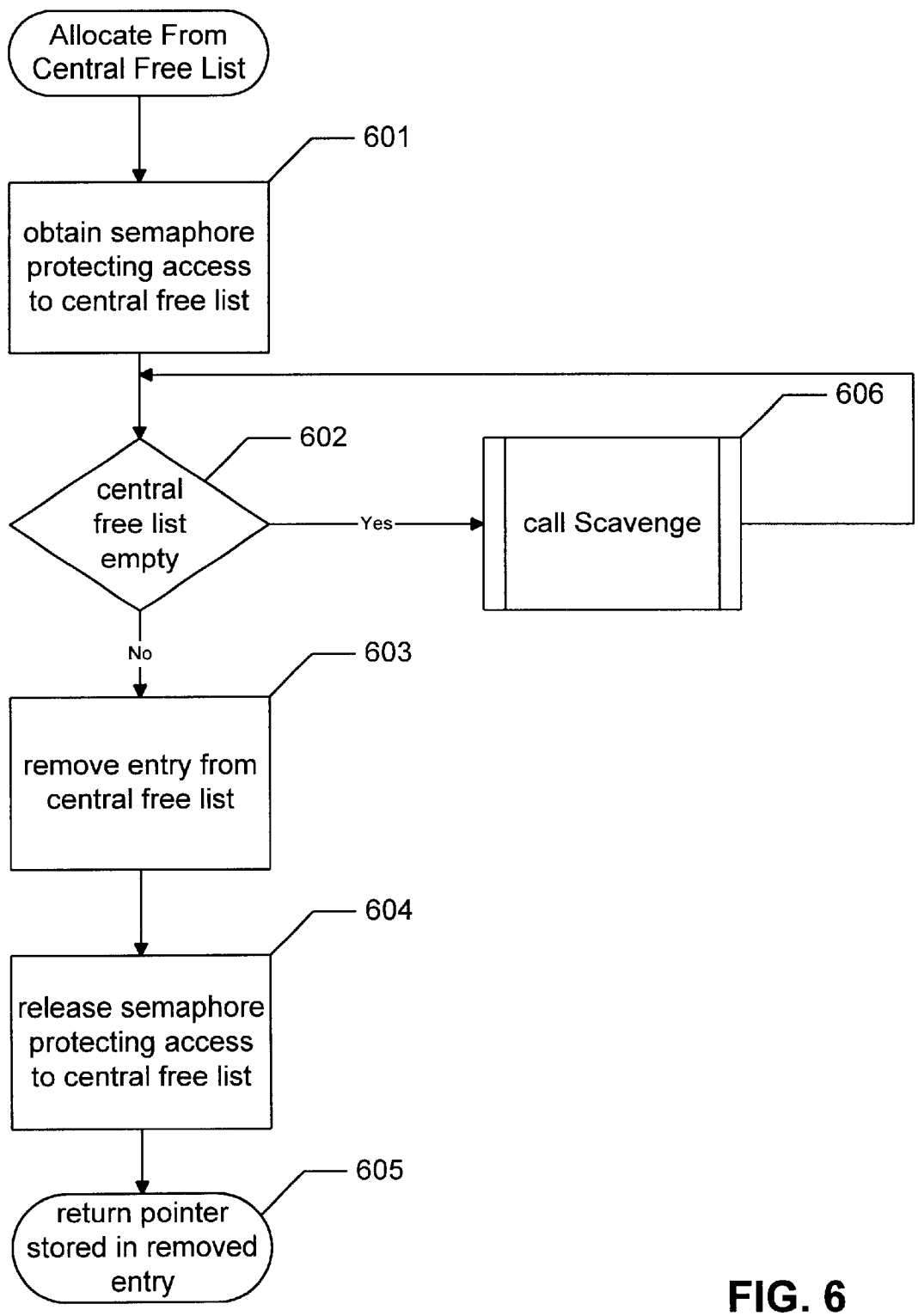
FIG. 6 is a flow diagram of the Allocate From Central Free List subroutine.

FIG. 6 is a flow diagram of the Allocate From Central Free List subroutine. In step 601, the facility acquires the semaphore protecting access to the central free list, allowing it to modify the central free list. If the semaphore is currently acquired by another thread, the thread calling Allocate From Central Free List subroutine is suspended, and step 601 does not complete until the semaphore is released and the thread calling the Allocate From Central Free List subroutine is allowed to acquire the semaphore. In step 602, if the central free list is empty, then the facility continues at step 606, otherwise the facility continues at step 603. In step 603, the facility removes an item from the central free list. In step 604, the facility releases the semaphore protecting access to the central free list. In step 605, the facility returns the pointer stored in the item removed from the central free list, thereby allocating the instance represented by the removed item. In step 606, because the central free list is empty, the facility calls a Scavenge subroutine in order to collect instances from the individual free lists and transfer them to the central free list. The Scavenge subroutine is discussed in greater below in conjunction with FIG. 7. If the Scavenge subroutine fails to collect any instances from the individual lists, the facility preferably returns an error (not shown). After step 606, the facility continues at step 602 to allocate a selector represented by an item collected by the Scavenge subroutine.

Figure 7:
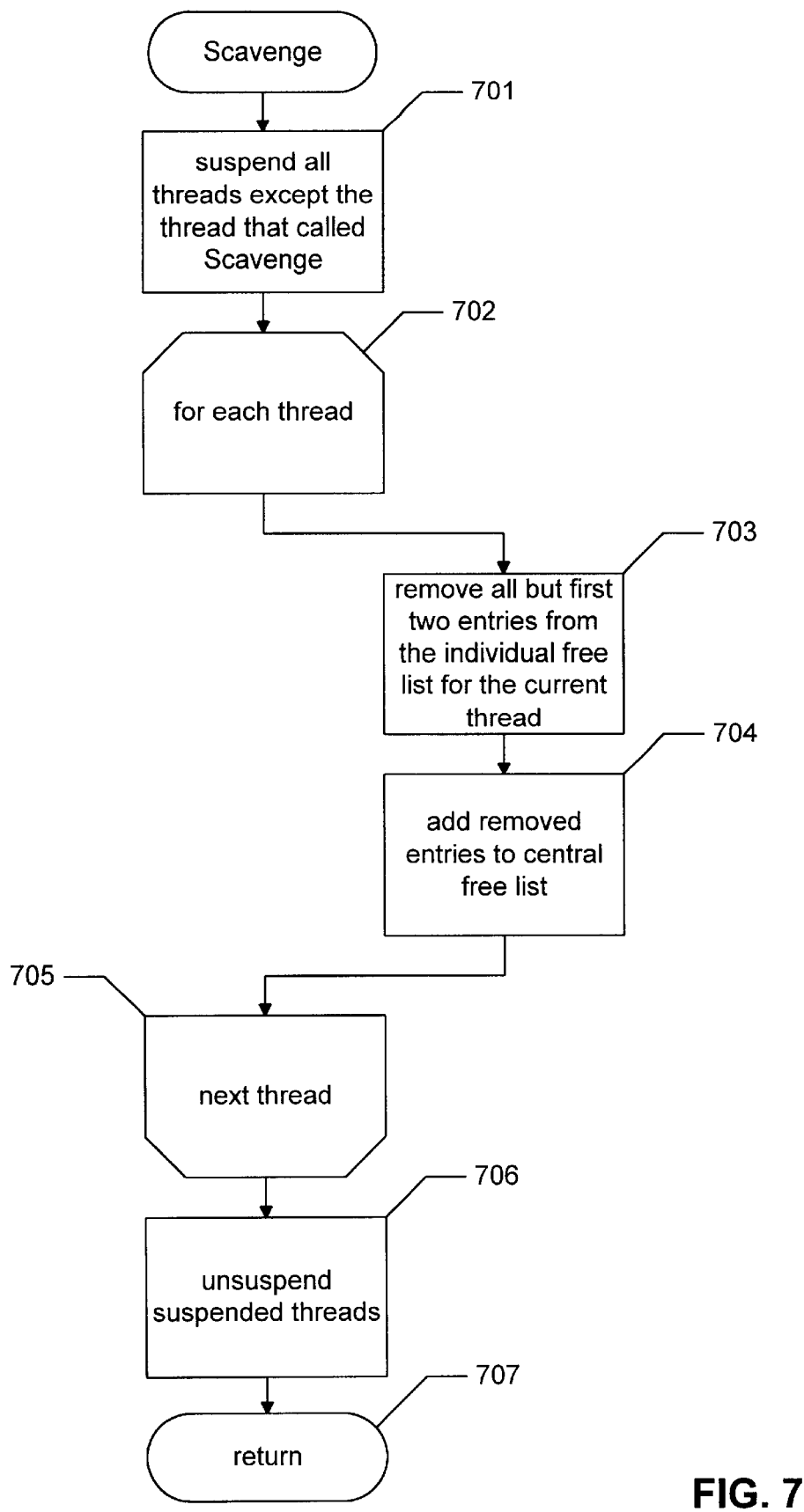
FIG. 7 is a flow diagram of the Scavenge subroutine.

FIG. 7 is a flow diagram of the Scavenge subroutine. In step 701, the facility suspends all of the threads except for the thread that called the Scavenge subroutine. In steps 702–705, the facility loops through each thread and transfers all but the first two items from the individual free list for the thread to the central free list. Step 702 marks the beginning of this loop, and step 705 the end. These "loop limit" symbols are discussed on page 6 of ANSI/ISO 5807-1985, a standard for, among other things, symbols and conventions for program flow charts promulgated by the International Standards Organization and adopted by the American National Standards Institute. In step 703, the facility removes all but the first two items from the list for the current thread. The first two items of the list for the current thread are preferably not removed, because the current thread may have been suspended in the middle of adding an item to or removing an item from the individual free list, which could cause either the connection between the head and the first item or the connection between the first item and the second item to be unstable. In step 704, the facility adds the removed items to the central free list. In step 705, the facility repeats the loop for the next thread. In step 706, the facility unsuspends the threads suspended in step 701. In step 707, the Scavenge subroutine returns.

Figure 8:
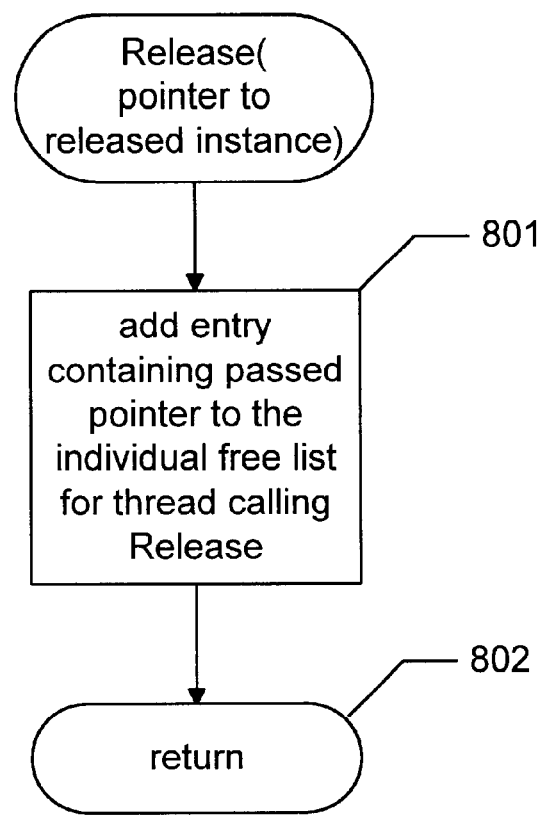
FIG. 8 is a flow diagram of the Release subroutine.

FIG. 8 is a flow diagram of the Release subroutine. Threads call the Release subroutine in order to release an instance that the thread is finished using, passing a pointer to the instance as a parameter. In step 801, the facility adds an item to the individual free list for the thread calling the Release subroutine that contains the pointer passed to the Release subroutine. Further, because the Scavenge subroutine depends on being able to begin at the head for an individual list, traverse from the head past the first two items in the list, and collect the remaining items in the list, the facility preferably adds an item at the beginning of the individual free list by first copying the pointer from the head to the new item, then storing a pointer to the new item in the head, so that the head is always pointing to the body of the list. In step 802, the facility returns.

While this invention has been shown and described with reference to preferred embodiments, it will be understood by those skilled in the art that various changes or modifications in form and detail may be made without departing from the scope of the invention. For example, the facility may be used to manage resources of any type, such as memory blocks, input/output buffers, unique identifiers, or data objects. Also, the facility may be implemented in other programmatic units than the operating system. For instance, one or more application programs designed to execute in conjunction with a conventional operating system could themselves each implement their own individual free list, without the participation or knowledge of the operating system.

We claim:

1. A method in a computer system for allocating available segments of memory in response to requests, each from one of a plurality of consumer computer programs, all available segments of memory being indistinguishable for purposes of allocation, such that any available segment of memory will satisfy any allocation request, the computer system having a master pool capable of holding available segments of memory, comprising the steps of:

(a) for each of the plurality of consumer computer programs, maintaining an individual pool of available segments of memory for a consumer computer program; and (b) upon receiving a request for the allocation of any available segment of memory from a requesting consumer computer program among the plurality of consumer computer programs:

(i) determining whether the individual pool of available segments of memory for the requesting consumer computer program contains one or more available segments of memory;

(ii) directly in response to determining that the individual pool of available segments of memory for the requesting consumer computer program contains one or more available segments of memory, allocating an available segment of memory from the individual pool of available segments of memory for the requesting consumer computer program, without using a synchronization mechanism;

(iii) directly in response to determining that the individual pool of available segments of memory for the requesting consumer computer program does not contain any available segments of memory, allocating an available segment of memory from the master pool of available segments of memory for the requesting consumer computer program, such that the allocated segment of memory ceases to be available; and (c) when the allocated segment of memory is released by the requesting consumer computer program, placing the released segment of memory in the individual pool for the requesting consumer computer program.

2. The method of claim 1 wherein allocating step (iii) includes the step of inhibiting other access to the master pool of available segments of memory during the performance of allocating step (iii).

3. The method of claim 1 wherein allocating step (iii) includes the steps of:

(A) if the master pool of available segments of memory contains one or more available segments of memory, allocating an available segment of memory from the master pool of available segments of memory for the requesting consumer computer program; and (B) if the master pool of available segments of memory does not contain any available segments of memory:

(1) transferring one or more available segments of memory from one or more of the individual pools of available segments of memory to the master pool of available segments of memory, and (2) allocating a transferred available segment of memory for the requesting consumer computer program.

4. The method of claim 3, wherein transferring step (1) includes the step of inhibiting other access to the individual pools of available segments of memory during the performance of transferring step (1).

5. The method of claim 3, wherein an allocating step (A) includes a step of inhibiting other access to the master pool of available segments of memory using the performance of allocating step (A), and wherein transferring step (1) includes the step of inhibiting other access to the master pool of available segments of memory during the performance of transferring step (1).

6. A method in a computer system for managing free memory selectors, comprising the steps of:

initially storing a reference to each free memory selector in a central free memory selector list;

for each of a plurality of execution threads, creating an individual free memory selector list; and when an execution thread requests a free memory selector:

under the control of the requesting execution thread, attempting to satisfy the request with a free memory selector referred to by a reference stored in the individual free memory selector list for the requesting execution thread, without using a synchronization mechanism, if the attempt to satisfy the request with the free memory selector referred to by the reference stored in the individual free memory selector list for the requesting execution thread does not succeed, under the control of the requesting execution thread, immediately attempting to satisfy the request with a free memory selector referred to by the reference stored in the central free memory selector list, and if the attempt to satisfy the request with a free memory selector referred to by a reference stored in the central free memory selector list does not succeed:

under the control of the requesting execution thread, immediately collecting references to free memory selectors from the individual free memory selector lists;

moving the collected references to the central free memory selector list;

under the control of the requesting execution thread, again immediately attempting to satisfy the request with the free memory selector referred to by a reference stored in the central free memory selector list; and when an execution thread releases a free memory selector, storing a reference to the released free memory selector in the individual free memory selector list for the releasing execution thread.

7. The method of claim 6, wherein the collecting step collects less than all of the references from each individual free memory selector list.

8. The method of claim 6, further including the step of suspending the execution threads during the collecting step.

9. The method of claim 6, further including the step of protecting access to the central free memory selector list with a synchronization device during the steps of attempting to satisfy the request with a free memory selector referred to by a reference stored in the central free memory selector list and of moving the collected references to the central free memory selector list.

10. The method of claim 6, wherein the free memory selectors are stored in a selector table, wherein the step of initially storing a reference to each free memory selector in a central free selector list includes the step of creating a master linked list linking together all of the free selectors and headed by a master head node by storing in the master head node a memory selector identifier identifying a first free memory selector constituting a link to the first free memory selector and storing in all but a last free memory selector a memory selector identifier identifying another free memory selector constituting a link to that free memory selector and storing in the last free memory selector a null selector identifier.

11. The method of claim 6 wherein:

the step of creating an individual free selector list for each of a plurality of execution threads includes the step of storing a null selector identifier in a head node for each of the plurality of execution threads, and the step of, when an execution thread releases a free memory selector, storing a reference to the released free memory selector in the individual free memory selector list for the releasing execution thread includes the step of adding the released free memory selector to a linked list for the releasing thread headed by a head node for the releasing thread by storing in the head node for the releasing thread a selector identifier identifying the released free memory selector and storing in the released free memory selector the selector identifier formerly stored in the head node for the releasing thread.

12. An apparatus for managing free segments of memory in a computer system having multiple execution threads, all available segments of memory being indistinguishable for purposes of allocation, such that any available segments of memory will satisfy any allocation request, comprising:

a central pool memory for storing references to free segments of memory available for use by any execution thread;

a synchronization mechanism for protecting the central pool memory from simultaneous access by multiple execution threads;

an individual pool memory for each execution thread for storing references to free segments of memory available for use by the execution thread;

an allocator for, directly in response to a request for a free segment of memory by an execution thread, allocating to the requesting execution thread a free segment of memory referred to by a reference stored in the individual pool memory for the requesting execution thread, without using a synchronization mechanism, and, in the absence of any references to free segments of memory stored in the individual pool memory for the requesting execution thread, allocating to the requesting execution thread a free segment of memory referred to by a reference stored in the central pool memory, such that the allocated segment of memory ceases to be available; and a deallocator for, in response to release by the execution thread of the segment of memory allocated by the allocator, storing a reference to the segment of memory in the individual pool memory for the execution thread.

13. The apparatus of claim 12, further including a scavenger for transferring references to free segments of memory from individual pool memories to the central pool memory.

14. The apparatus of claim 13, further including a free segment of memory shortage detector for detecting a shortage of references to free segments of memory in the central pool memory and activating the scavenger.

15. The apparatus of claim 13, further including an execution thread suspender for suspending the execution of the execution threads while the scavenger is operating.

16. A computer-readable medium containing data that causes a computer system to allocate available segments of memory in response to requests, each from one of the plurality of consumer computer programs, all available segments of memory being indistinguishable for purposes of allocation, such that any available segment of memory will satisfy any allocation request, the computer system having a master pool capable of holding available segments of memory, for performing the steps of:

(a) maintaining an individual pool of available segments of memory for each of the plurality of consumer computer programs;

(b) upon receiving a request from a requesting consumer computer program among the plurality of consumer computer programs:

(i) determining whether the individual pool of available segments of memory for the requesting consumer computer program contains one or more available segments of memory;

(ii) directly in response to determining that the individual pool of available segments of memory for the requesting consumer computer program contains one or more available instances of the resource, allocating an available segment of memory from the individual pool of available segments of memory for the requesting consumer computer program, without using a synchronization mechanism, and (iii) directly in response to determining that the individual pool of available segments of memory for the requesting consumer computer program does not contain any available segments of memory, allocating an available segment of memory from the master pool of available segments of memory for the requesting consumer computer program, such that the allocated segment of memory ceases to be available; and when the allocated segment of memory is released by the requesting consumer computer program, placing the released segment of memory in the individual pool for the requesting consumer computer program.

17. A computer-readable medium containing data that causes a computer system to manage free memory selectors by performing the steps of:

initially storing a reference to each free memory selector in a central free memory selector list; and for each of a plurality of execution threads, creating an individual free memory selector list;

when an execution thread requests a free memory selector:

under the control of the requesting execution thread, attempting to satisfy the request with a free memory selector referred to by reference stored in the individual free memory selector list for the requesting execution thread, without using a synchronization mechanism, if the attempt to satisfy the request with a free memory selector referred to by a reference stored in the individual free memory selector list for the requesting execution thread does not succeed under the control of the requesting execution thread, immediately attempting to satisfy the request with a free memory selector referred to by the reference stored in the central free memory selector list, and if the attempt to satisfy the request with a free memory selector referred to by the reference stored in the central free memory selector list does not succeed:

under the control of the requesting execution thread, immediately collecting references to free memory selectors from the individual free memory selector lists;

moving the collected references to the central free memory selector list; and under the control of the requesting execution thread, again immediately attempting to satisfy the request with a free memory selector referred to by a reference stored in the central free memory selector list; and when an execution thread releases a free memory selector, storing a reference to the released free memory selector in the individual free memory selector list for the releasing execution thread.

18. A memory device containing a resource allocation data structure from which available segments of memory may be allocated to a plurality of consumer computer programs, all available segments of memory being indistinguishable for purposes of allocation, such that any available segments of memory will satisfy any allocation request, comprising:

for each of the plurality of consumer computer programs, an individual pool from which available segments of memory may be allocated to the consumer computer program in response to any request from the consumer computer program, without using a synchronization mechanism, and to which a segment of memory is placed when the allocated segment of memory is released by the requesting consumer computer program; and a master pool from which available segments of memory may be allocated to a consumer computer program directly in response to a request from the consumer computer program if the individual pool for the consumer computer program does not contain any available segments of memory.

19. The memory device of claim 18 wherein a synchronization mechanism is employed to synchronize allocation of an available segment of memory to a consumer computer program from the master pool.

20. The memory device of claim 18 wherein the master pool, when it does not contain any available segment of memory, is replenished from the individual pools.

* * * * *

UNITED STATES PATENT AND TRADEMARK OFFICE
CERTIFICATE OF CORRECTION

PATENT NO. : 6,363,410 B1  Page 1 of 1
DATED : March 26, 2000
INVENTOR(S) : A. Kanamori et al.

It is certified that error appears in the above-identified patent and that said Letters Patent is hereby corrected as shown below:

<u>Title page,</u>
Item [56], References Cited, OTHER PUBLICATIONS., " "Memory Management and Response Time" Communications of the ACM, vol. 20, pp 153-165, 1977, R.M. Brown, J.C, Browne, and K.M. Chandy "Some Key Issues in the Design of Distributed Garlize Collection and References", Marc Shapiro, Apr. 1994.*" should read
-- R.M. Brown, J.C. Browne, and K.M. Chandy, "Memory Management and Response Time," Communications of the ACM, vol. 20, pp. 153-165, 1977.*

Marc Shapiro, "Some Key Issues in the Design of Distributed Garbage Collection and References," Apr. 1994.* --

<u>Column 4,</u>
Line 32, "reclaims it" should read -- reclaims the instance --
Line 32, "placing the instance" should read -- placing it --

<u>Column 7,</u>
Line 19, "facility after it" should read -- facility, after it --
Line 45, "empty, and" should read -- empty; and --

Signed and Sealed this

Fourteenth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.      : 6,363,410 B1
DATED           : March 26, 2002
INVENTOR(S)     : A. Kanamori et al.

It is certified that error appears in the above-identified patent and that said Letters Patent is hereby corrected as shown below:

Title page,
Item [56], References Cited, OTHER PUBLICATIONS., " "Memory Management and Response Time" Communications of the ACM, vol. 20, pp 153-165, 1977, R.M. Brown, J.C, Browne, and K.M. Chandy "Some Key Issues in the Design of Distributed Garlize Collection and References", Marc Shapiro, Apr. 1994.*" should read
-- R.M. Brown, J.C. Browne, and K.M. Chandy, "Memory Management and Response Time," Communications of the ACM, vol. 20, pp. 153-165, 1977.*

Marc Shapiro, "Some Key Issues in the Design of Distributed Garbage Collection and References," Apr. 1994.* --

Column 4,
Line 32, "reclaims it" should read -- reclaims the instance --
Line 32, "placing the instance" should read -- placing it --

Column 7,
Line 19, "facility after it" should read -- facility, after it --
Line 45, "empty, and" should read -- empty; and --

This Certificate of Correction supersedes certificate issued January 14, 2003.

Signed and Sealed this

Fifth Day of August, 2003

JAMES E. ROGAN
*Director of the United States Patent and Trademark Office*